United States Patent
Zhang et al.

(10) Patent No.: US 12,256,012 B2
(45) Date of Patent: Mar. 18, 2025

(54) METHOD AND DEVICE FOR PRIVACY PROTECTION BIOMETRIC AUTHENTICATION, AND ELECTRONIC DEVICE

(71) Applicants: ZHEJIANG UNIVERSITY, Zhejiang (CN); ZJU-HANGZHOU GLOBAL SCIENTIFIC AND TECHNOLOGICAL INNOVATION CENTER, Zhejiang (CN)

(72) Inventors: Bingsheng Zhang, Hangzhou (CN); Zhigao Wang, Hangzhou (CN); Kui Ren, Hangzhou (CN)

(73) Assignees: ZHEJIANG UNIVERSITY, Hangzhou (CN); ZJU-HANGZHOU GLOBAL SCIENTIFIC AND TECHNOLOGICAL INNOVATION CENTER, Hangzhou (CN)

(*) Notice: Subject to any disclaimer, the term of this patent is extended or adjusted under 35 U.S.C. 154(b) by 0 days.

(21) Appl. No.: 18/605,868

(22) Filed: Mar. 15, 2024

(65) Prior Publication Data

US 2024/0223377 A1 Jul. 4, 2024

Related U.S. Application Data

(63) Continuation of application No. PCT/CN2022/072506, filed on Jan. 18, 2022.

(30) Foreign Application Priority Data

Jan. 13, 2022 (CN) .......................... 202210038504.7

(51) Int. Cl.
*H04L 9/40* (2022.01)
*H04L 9/08* (2006.01)
*H04L 9/32* (2006.01)

(52) U.S. Cl.
CPC .......... *H04L 9/3231* (2013.01); *H04L 9/0825* (2013.01); *H04L 9/3247* (2013.01)

(58) Field of Classification Search
CPC .... H04L 9/3231; H04L 9/0825; H04L 9/3247
See application file for complete search history.

(56) References Cited

U.S. PATENT DOCUMENTS 7,188,362 B2 * 3/2007 Brandys ................ H04L 9/3247
726/28
10,516,527 B1 12/2019 Machani et al.
(Continued)

FOREIGN PATENT DOCUMENTS

CN 104917609 A 9/2015
CN 111600869 A 8/2020
(Continued)

OTHER PUBLICATIONS

International Search Report (PCT/CN2022/072506); Date of Mailing: Sep. 1, 2022.
(Continued)

*Primary Examiner* — Ghodrat Jamshidi
(74) *Attorney, Agent, or Firm* — W&G Law Group

(57) ABSTRACT

A method and an apparatus for privacy protection biometric authentication and an electronic device. The method comprises the following steps: constructing a corresponding a biological data template according to a biological information data set input by a user when registering; generating a pair of public key and private key by asymmetric cryptography technology; generating encrypted biological data by a secret sharing solution and OKVS technology according to the biological data template and the private key; sending the public key and the encrypted biological data to a server; recovering the private key by OKVS technology according to the biological data input by the user during authentication and the encrypted biological data; constructing a signature
(Continued)

according to the recovered private key and the corresponding public key; sending the signature to the server, so that the server verifies the user according to the public key and the signature.

6 Claims, 5 Drawing Sheets

(56) References Cited

U.S. PATENT DOCUMENTS

| | | | |
|---|---|---|---|
| 11,070,378 B1* | 7/2021 | Griffin | H04L 9/3247 |
| 2002/0104006 A1* | 8/2002 | Boate | H04W 12/08 |
| | | | 713/186 |
| 2008/0065900 A1* | 3/2008 | Lee | H04L 9/3231 |
| | | | 708/620 |
| 2017/0222809 A1* | 8/2017 | Takahashi | H04L 63/0861 |
| 2019/0130090 A1* | 5/2019 | Li | H04L 63/0861 |
| 2019/0378142 A1* | 12/2019 | Darnell | H04L 63/0861 |
| 2020/0007338 A1* | 1/2020 | Oh | H04L 9/0866 |
| 2020/0228341 A1* | 7/2020 | Mohassel | H04L 9/3218 |
| 2020/0342118 A1 | 10/2020 | Yeo et al. | |
| 2020/0358614 A1* | 11/2020 | Fiske | H04L 9/0637 |
| 2021/0044429 A1* | 2/2021 | Yang | G06V 10/95 |
| 2021/0124815 A1* | 4/2021 | Rindal | G06F 21/32 |
| 2021/0336792 A1* | 10/2021 | Agrawal | H04L 9/30 |
| 2022/0129531 A1* | 4/2022 | Rindal | H04L 9/0825 |
| 2022/0131698 A1* | 4/2022 | Badrinarayanan | H04L 9/085 |
| 2022/0391518 A1* | 12/2022 | Motomiya | G06F 21/62 |
| 2023/0102423 A1* | 3/2023 | Yanai | H04L 9/14 |
| | | | 380/46 |

FOREIGN PATENT DOCUMENTS

| | | |
|---|---|---|
| CN | 113507380 A | 10/2021 |
| CN | 113516473 A | 10/2021 |

OTHER PUBLICATIONS

Notice Of Allowance(CN202210038504.7); Date of Mailing: May 17, 2022.

Garimella, Gayathri et al Oblivious Key-Value Stores and Amplification for Private Set Intersection.

An overview of deep learning-based face recognition applications in the field of identity authentication.

* cited by examiner

METHOD AND DEVICE FOR PRIVACY PROTECTION BIOMETRIC AUTHENTICATION, AND ELECTRONIC DEVICE

CROSS-REFERENCE TO RELATED APPLICATIONS

The present application is a continuation of International Application No. PCT/CN2022/072506, filed on Jan. 18, 2022, which claims priority to Chinese Application No. 202210038504.7, filed on Jan. 13, 2022, the contents of both of which are incorporated herein by reference in their entireties.

TECHNICAL FIELD

The present disclosure relates to the field of privacy protection identity authentication, in particular to a method and a device for privacy protection biometric authentication and an electronic device.

BACKGROUND

In the current society, information security is becoming more and more important. Cryptography is often used to implement a system, but one of the security challenges of this system is to maintain the confidentiality of the key. The effective solution is to use the user's biological information (such as fingerprint) as authentication to obtain the key, because biological information is often unique. But a biometric authentication system itself is vulnerable to attack. Because of the need of authentication, it often needs to store the user's biological information data in the database of the server. Once the server is attacked, all the confidential information of the user will be leaked. Then, in order to solve this problem, people have adopted many privacy protection biometric authentication technologies, the most classic of which is the fuzzy vault technology. Since the biological feature identification system based on fuzzy vault technology was put forward in 2007, most of the biometric authentication methods for privacy protection have been improved in the following ten years.

In the process of realizing the present disclosure, the inventor found that there are at least the following problems in the prior art:

Fuzzy vault technology has two obvious disadvantages. The first is the redundancy of data storage. Because of the security requirements of fuzzy vault technology, in order to protect a biological information (such as fingerprint information), nearly 100 times of false points must be generated to confuse it. The second is that if the same person uses his own creature to encrypt and form two independent fuzzy vaults, then these two fuzzy vaults can be unlocked from each other, because the coincidence point between them must contain a large number of real points, enough to reach the threshold of unlocking, which will become a huge potential safety hazard.

SUMMARY

The embodiment of the present disclosure aims to provide a method and a device for privacy protection biometric authentication, and an electronic device, so as to solve the technical problems in related technologies that the data storage capacity is large and the same person's biological information can be mutual unlocked by two systems encrypted by fuzzy vault technology.

According to a first aspect of the embodiment of the present disclosure, provided is a method for privacy protection biometric authentication, which is applied to a client, and includes:
constructing a corresponding a biological data template according to a biological information data set input by a user when registering;
generating a pair of public key and private key by asymmetric cryptography technology;
generating encrypted biological data by a secret sharing solution and OKVS (Oblivious Key-Value Store) technology according to the biological data template and the private key;
sending the public key and the encrypted biological data to a server;
recovering the private key by OKVS technology according to the biological data input by the user during authentication and the encrypted biological data;
constructing a signature according to the recovered private key and the corresponding public key; and
sending the signature to the server, so that the server verifies the user according to the public key and the signature.

Further, the step of constructing a corresponding a biological data template according to a biological information data set input by a user when registering includes:
preprocessing the biological information data set;
extracting features of the preprocessed biological information feature set to obtain biological feature data according to a type of biological information in the biological information data set;
quantifying the biological feature information according to a category corresponding to the biological feature data; and
constructing the corresponding biological feature template according to the quantified biological feature data.

Further, the step of generating encrypted biological data by a secret sharing solution and OKVS technology according to the biological data template and the private key includes:
sharing the private key as a corresponding number of secret shares of the private key according to a number of feature points in the biological data template; and
generating the encrypted biological data by the OKVS technology according to the biological data template and the secret shares of the corresponding private key.

Further, the step of recovering the private key by OKVS technology according to the biological data input by the user during authentication and the encrypted biological data includes:
constructing a verification template according to the biological data input by the user during verification;
decrypting the encrypted biological data by the OKVS technology according to the verification template to obtain a plurality of secret shares of the private key. In an embodiment a number of the secret shares of the private key is greater than a predetermined number;
recovering the private key according to the secret shares of the private key.

According to a second aspect of the embodiment of the present disclosure, provided is a device for privacy protection biometric authentication. In an embodiment the device is applied to a client and includes:

a first construction module configured to construct a corresponding a biological data template according to a biological information data set input by a user when registering;

a first generation module configured to generate a pair of public key and private key by asymmetric cryptography technology;

a second generation module configured to generate encrypted biological data by a secret sharing solution and OKVS technology according to the biological data template and the private key;

a first sending module configured to send the public key and the encrypted biological data to a server;

a recovery module configured to recover the private key by OKVS technology according to the biological data input by the user during authentication and the encrypted biological data;

a construction module configured to construct a signature according to the recovered private key and the corresponding public key; and a second sending module configured to send the signature to the server, so that the server verifies the user according to the public key and the signature.

According to a third aspect of the embodiment of the present disclosure, provided is a method for privacy protection biometric authentication. In an embodiment the method is applied to a server and includes the following steps of:

receiving a public key sent by a client. In an embodiment the public key is generated by the client using asymmetric cryptography technology;

acquiring encrypted biological data. In an embodiment the encrypted biological data is sent by the client or generated by the server by using a secret sharing solution and OKVS technology according to a biological data template and a private key. In an embodiment the private key is generated by the client by using the asymmetric cryptography technology, and the biological data template is constructed by the client according to a biological information data set input by a user when registering;

storing the public key and the encrypted biological data;

receiving a signature sent by the client. In an embodiment the signature is constructed by the client according to a recovered private key and a corresponding public key, and the recovered private key is obtained by recovering the private key by the client according to biological data input by the user during verification by using the OKVS technology; and verifying the user according to the public key and the signature.

Further, the step of the step of generating encrypted biological data by a secret sharing solution and OKVS technology according to the biological data template and the private key includes:

sharing the private key as a corresponding number of secret shares of the private key according to a number of feature points in the biological data template; and generating the encrypted biological data by the OKVS technology according to the biological data template and the secret shares of the corresponding private key.

According to a fourth aspect of the embodiment of the present disclosure, provided is a device for privacy protection biometric authentication. In an embodiment the device is applied to a server and includes:

a first receiving module configured to receive a public key sent by a client. In an embodiment the public key is generated by the client using asymmetric cryptography technology;

an acquisition module configured to acquire encrypted biological data. In an embodiment the encrypted biological data is sent by the client or generated by the server by using a secret sharing solution and OKVS technology according to a biological data template and a private key. In an embodiment the private key is generated by the client by using the asymmetric cryptography technology, and the biological data template is constructed by the client according to a biological information data set input by a user when registering;

a storage module configured to store the public key and the encrypted biological data;

a second receiving module configured to receive a signature sent by the client. In an embodiment the signature is constructed by the client according to a recovered private key and a corresponding public key, and the recovered private key is obtained by recovering the private key by the client according to biological data input by the user during verification by using the OKVS technology; and a verification module configured to verify the user according to the public key and the signature.

According to a fifth aspect of the embodiment of the present disclosure, provided is an electronic device including:

one or more processors;

a memory for storing one or more programs;

wherein when the one or more programs are executed by the one or more processors, the one or more processors implement the method according to the first or the third aspect.

According to a sixth aspect of the embodiment of the present disclosure, provided is a computer readable storage medium on which computer instructions are stored. In an embodiment the instructions, when executed by a processor, implement the steps of the method according to the first or the third aspect.

The technical solution provided by the embodiment of the present disclosure can include the following beneficial effects:

As can be seen from the above embodiments, the present disclosure uses secret sharing solution and OKVS technology to encrypt the biological data template to generate encrypted biological data, so that even if the data is leaked, the privacy of users will not be exposed; At the same time, by using OKVS technology, the storage capacity of encrypted biological data with privacy protection function is greatly reduced; According to the recovered private key and the corresponding public key, a signature is constructed, so that the real biological information of the user only stays in the local client, and the secure communication between the client and the untrusted server is ensured; the present disclosure also has the advantages of simple use, high efficiency, safety, privacy protection and remote use.

It should be understood that the above general description and the following detailed description are exemplary and explanatory only, and are not intended to limit the present disclosure.

BRIEF DESCRIPTION OF DRAWINGS

The drawings herein are incorporated into and constitute a part of the description, illustrate embodiments consistent with the present disclosure, and together with the specification, serve to explain the principle of the present disclosure.

DESCRIPTION OF EMBODIMENTS

Figure 1:
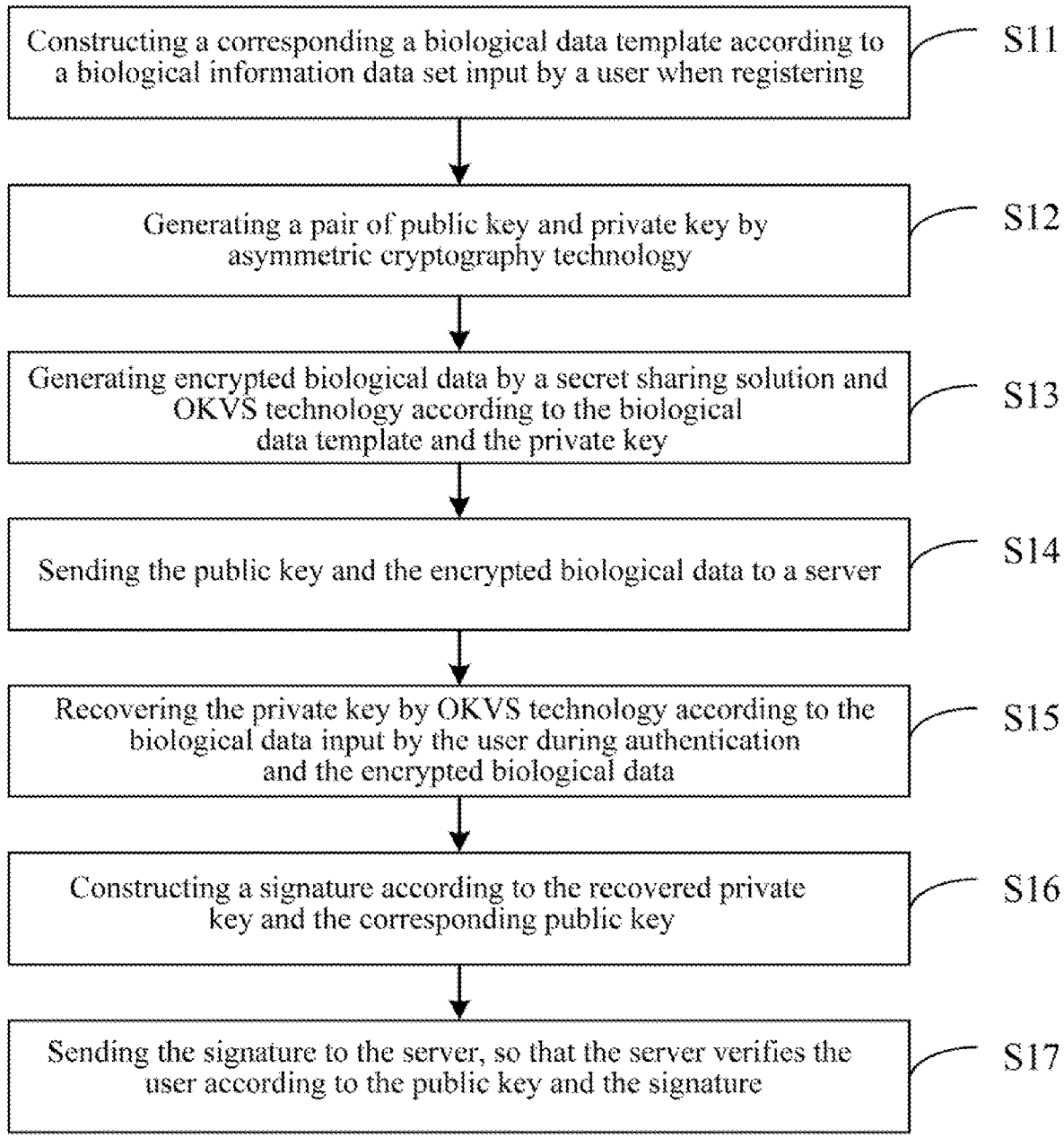
FIG. 1 is a flowchart of a method for privacy protection biometric authentication (applied to a client) according to an exemplary embodiment.

Exemplary embodiments will be described here in detail, examples of which are shown in the accompanying drawings. When the following description refers to the drawings, unless otherwise indicated, the same numbers in different drawings indicate the same or similar elements. The embodiments described in the following exemplary embodiments do not represent all the embodiments consistent with this application. On the contrary, they are only examples of devices and methods consistent with some aspects of this application as detailed in the appended claims.

The terminology used in this application is for the purpose of describing specific embodiments only, and is not intended to limit this application. The singular forms of "a", "said" and "the" used in this application and the appended claims are also intended to include plural forms, unless the context clearly indicates other meaning. It should also be understood that the term "and/or" used herein refers to and includes any or all possible combinations of one or more associated listed items.

It should be understood that although the terms "first", "second", "third", etc. may be used in this application to describe various information, such information should not be limited to these terms. These terms are only used to distinguish the same type of information from each other. For example, without departing from the scope of this application, the first piece of information can also be called the second piece of information, and similarly, the second piece of information can also be called the first piece of information. Depending on the context, the word "if" as used here can be interpreted as "when" or "during" or "in response to a determination".

Firstly, the OKVS technology is explained:

OKVS (Oblivious Key-Value Store) is a cryptographic protocol. First of all, it needs to understand the KVS (Key-Value Store) protocol. A KVS protocol contains two algorithms, Encode algorithm and Decode algorithm. The input of Encode algorithm is a set of key-value pairs $\{(k_i, v_i)\}$, and the output is a data structure S that stores key-value information; there is a probability $2^{-\lambda}$ of failure, a termination symbol $\bot$ is output, where $\lambda$ is an adjustable parameter. Decode algorithm is to input the data structure S that stores key information and a key $k_i$, and output the corresponding value $v_i$.

$$S \mid \bot \leftarrow \text{Encode}(\{(k_1, v_1), (k_2, v_2) \ldots (k_n, v_n)\})$$

$$v_i \leftarrow \text{Decode}(S, k_i)$$

OKVS is to add security requirements on the basis of KVS. Generally speaking, if the value of v is random, it will be unable to distinguish the data structures S formed by two keys k with the same number. The detailed security definition of OKVS will be given below.

If KVS is OKVS, for all the different $\{k_1^0, k_2^0, k_3^0, \ldots, k_n^0\}$ and different ones $\{k_1^1, k_2^1, k_3^1, \ldots, k_n^1\}$ (the superscript of $k_i$ is only used to distinguish the differences between two groups of $k_i$), if the Encode algorithm does not fail, then the $R(k_1^0, k_2^0, k_3^0, \ldots, k_n^0)$ and $R(k_1^1, k_2^1, k_3^1, \ldots, k_n^1)$ are indistinguishable. The program R is defined as follows:

$R(k_1, k_2, k_3, \ldots, k_n)$:

$$\text{for } i \in [n]: \text{do } v_i \leftarrow V$$

$$\text{return Encode}(\{k_1, v_1\}, \{k_2, v_2\}, \ldots, \{k_n, v_n\})$$

Linear OKVS is a classification of the OKVS protocol, which means that the Decode algorithm can be written as the inner product of the value of key k after some mapping d and S, which is as follows $$\text{Decode}(S, k) = \langle d(k), S \rangle \Leftrightarrow \sum_{j=1}^{n} d(k)_j S_j$$

The relationship between key k, value v and data structure S in linear OKVS can also be written in the following form:

$$\begin{pmatrix} v_1 \\ \ldots \\ v_n \end{pmatrix} = \begin{pmatrix} d(k_1) \\ \ldots \\ d(k_n) \end{pmatrix} S^T$$

The specific implementation of several OKVS technologies will be briefly listed here.

Example 1: Polynomial

One of the most natural and simple ideas is to use polynomial P, so that the polynomial P satisfies $P(k_i)=v_i$, where the coefficient of the polynomial P is the data structure S of OKVS. When decrypting, it only needs to solve the inner product of $(1, k_i, k_i^2, \ldots, k_i^n)$ with S to obtain $v_i$ by decryption. From the description, it can be known that the OKVS technology based on polynomial is a linear OKVS technology.

Example 2: Dense Matrix

If there is a random matrix of m rows and n columns, and $m \geq n+\lambda-1$ is satisfied, then the probability of linear correlation of this matrix is less than $2^{-\lambda}$. Based on this, a way to construct OKVS is to map $d(k_i)$ to a random vector $d(k_i)$ in the domain $F^m$, and then solve the following linear equations:

$$\begin{pmatrix} v_1 \\ \ldots \\ v_n \end{pmatrix} = \begin{pmatrix} d(k_1) \\ \ldots \\ d(k_n) \end{pmatrix} S^T$$

Obtaining the data structure of OKVS.

Example 3: 3H-GCT (3-Hash Garbled Cuckoo Table)

3H-GCT is a form of hash, which contains three different hash functions $H_1$, $H_2$, $H_3$. Assuming that this hash table is represented as T, the $i^{th}$ element in the hash table T is represented by $T_i$, then if any value k is inserted into 3H-GCT, it will be represented as $k=T_{H_1(k)} \oplus T_{H_2(k)} \oplus T_{H_3(k)}$. The construction of OKVS of 3H-GCT is a linear OKVS. The hash table T is used as the encrypted data structure S in OKVS, and a binary vector with a value of 1 at $H_1$ (k), $H_2$(k), $H_3$(k), a value of 0 at other position values of 0 and a length of S is used as the mapping d(k) of k.

Assuming that user A needs to use the service provided by network platform B, user A needs to register account information on this platform and log in to enjoy the service. Both user A and network platform B want to use a convenient authentication method with privacy protection. User A wants to use biological information instead of traditional password key for identity authentication, and hopes that his account password can be encrypted, protected and stored safely, and not leaked to the server. In order to achieve the above requirements, the user A and the network platform B can use a method for privacy protection biometric authentication shown below to complete the identity authentication. In this embodiment, the network platform B is the client.

FIG. 1 is a flow chart of a method for privacy protection biometric authentication according to an exemplary embodiment. As shown in FIG. 1, the method is applied to a client and can include the following steps:

S11, constructing a corresponding a biological data template according to a biological information data set input by a user when registering;

S12, generating a pair of public key and private key by asymmetric cryptography technology;

S13, generating encrypted biological data by a secret sharing solution and OKVS technology according to the biological data template and the private key;

S14, sending the public key and the encrypted biological data to a server;

S15, recovering the private key by OKVS technology according to the biological data input by the user during authentication and the encrypted biological data;

S16, constructing a signature according to the recovered private key and the corresponding public key; and S17, sending the signature to the server, so that the server verifies the user according to the public key and the signature.

As can be seen from the above embodiments, the present disclosure uses secret sharing solution and OKVS technology to encrypt the biological data template to generate encrypted biological data, so that even if the data is leaked, the privacy of users will not be exposed; at the same time, by using OKVS technology, the storage capacity of the encrypted biological data with privacy protection function is greatly reduced; a signature is constructed according to the recovered private key and the corresponding public key, so that the real biological information of the user only stays in the local client, and the secure communication between the client and the untrusted server is ensured; the present disclosure also has the advantages of simple use, high efficiency, safety, privacy protection and remote use.

In an embodiment, because OKVS technology can greatly reduce the amount of storage after data encryption, OKVS is used to encrypt biological data. However, because of the security requirement of OKVS and the fact that two pieces of verification data formed by encryption of the same person's biological data should not be unlocked from each other, secret sharing technology will be used. Because of the perfect privacy of secret sharing technology, it is very difficult for attackers to restore users' biological information data, thus ensuring the overall security. At the same time, because of the characteristics of secret sharing itself, we can arbitrarily choose the number of secret shares, as long as it meets the requirements of correctness. In this way, even the encrypted data of the same person's biological information are different, the user's biological information cannot be recovered from two encrypted data of the same person's biological information.

Figure 2:
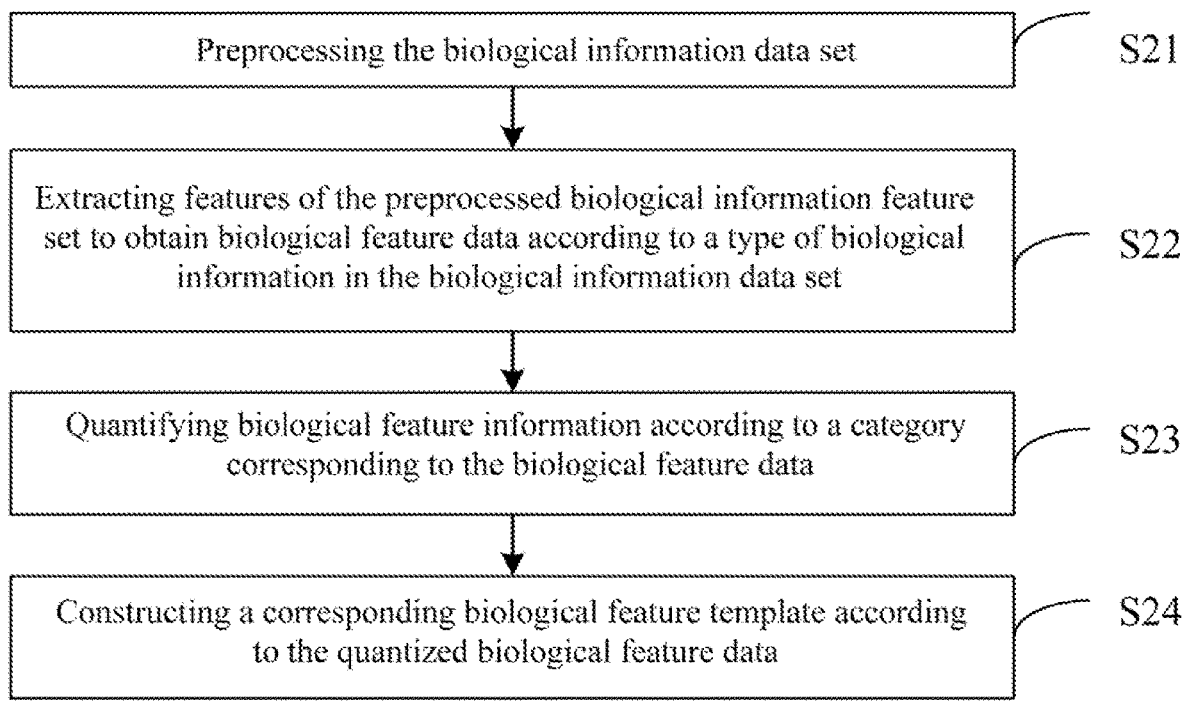
FIG. 2 is a flowchart of step S11 according to an exemplary embodiment.

In the concrete implementation of step S11, according to the biological information data set input by the user when registering, a corresponding biological data template is constructed;

In an embodiment, the essence of biometric authentication is actually a process of pattern recognition. It uses some common but different features of every natural person to verify a person's identity and determine whether the user is who he claims to be. Commonly used biological features include fingerprint, face, iris, voiceprint, etc. Besides, there are some immature recognition methods, such as gait recognition, finger vein recognition, etc. The steps of biological authentication mainly include the collection, extraction, quantification and comparison of biological features, among which the final effect of the whole processing process can be determined as long as it can match some biological data. As shown in FIG. 2, this step includes the following sub-steps:

S21, preprocessing the biological information data set;

In an embodiment, taking fingerprints and faces as examples, the collected fingerprints and faces are screened, grouped and labeled, and then the images are enhanced by Gabor filtering algorithm to make them clear, and the images are cut and rotated to make them align. This step is to reduce the interference of different factors in the process of biological information collection, so that the subsequent feature extraction can be more accurate.

S22, extracting features of the preprocessed biological information feature set to obtain biological feature data according to a type of biological information in the biological information data set;

In an embodiment, taking the face as an example, the face image is input into the trained deep neural network, and a fixed-length feature vector is output as the extracted feature; taking the fingerprint as an example, the endpoint and bifurcation points in the fingerprint are found as feature points, and their coordinates are shown.

S23, quantifying the biological feature information according to a category corresponding to the biological feature data; and In an embodiment, different kinds of biological features need to be quantified according to their distribution characteristics and comparison methods, so as to improve the accuracy of authentication.

In one embodiment, with the face as the biological feature, the feature vector generated by the deep neural network generally belongs to the real number range; firstly, it is necessary to divide the data range in the feature vector into different intervals according to the probability density of its data, and the number of intervals is generally $2^x$ (x is controllable precision), the values of the feature vectors falling in the intervals are converted into indexes (integers) of the corresponding intervals, and then the corresponding integers are coded into binary data according to some coding methods (such as binary reflection Gray code, binary representation of integers, etc.).

In another embodiment, fingerprint is used as the biological feature, and the coordinates of the fingerprint are originally based on the pixel length, but the generated value is too large and the authentication error is relatively large, so it is necessary to quantify it into a bit string with a fixed length, and divide the normal distribution curve of the fingerprint coordinates into $2^b$ blocks according to the probability, so that each block can be represented by a binary string of b bits.

S24, constructing a corresponding biological feature template according to the quantized biological feature data.

In an embodiment, taking a human face as an example, the quantized feature vectors are taken as final features, and the value of each feature vector is a feature point; taking fingerprint as an example, several points with similar distance are taken as a cluster, and the quantized coordinates of all points in this cluster are combined as the final features. The biological features obtained through the above quantization process can be used as feature templates for the subsequent encryption and authentication stage.

In the concrete implementation of step S12, a pair of public key and private key is generated by using asymmetric cryptography technology.

In an embodiment, a public parameter g is input to generate a pair of public and private keys, pk being the public key and sk being the private key, which satisfies $pk=g^{sk}$.

In the concrete implementation of step S13, the encrypted biological data is generated by using the secret sharing solution and OKVS technology according to the biological data template and the private key.

Figure 3:
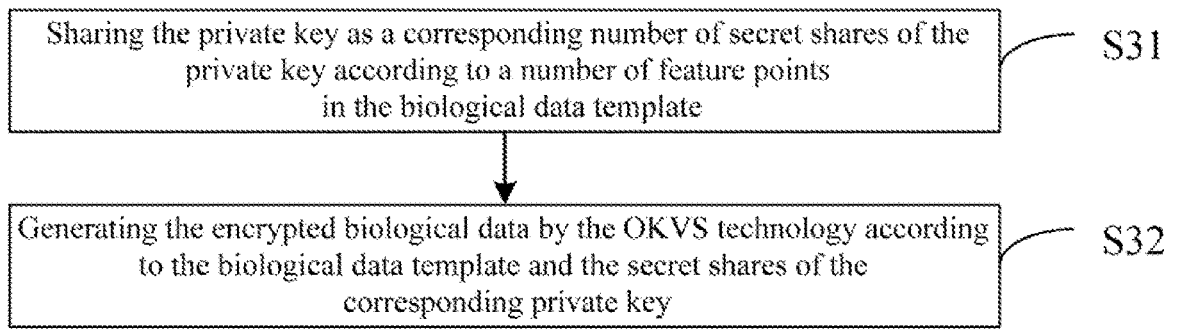
FIG. 3 is a flowchart of step S13 according to an exemplary embodiment.

In an embodiment, as shown in FIG. 3, this step includes the following sub-steps:

S31, sharing the private key as a corresponding number of secret shares of the private key according to a number of feature points in the biological data template.

In an embodiment, assuming that there are n feature points in the biological data template, secret shares of the private key sk is shared by (t,n), and n secret shares of the private keys are obtained.

S32: generating the encrypted biological data by the OKVS technology according to the biological data template and the secret shares of the corresponding private key.

In an embodiment, an OKVS technology is randomly selected, and biological data is used as a key, and the secret share of the private key is used as a value for encryption, and then encrypted biological data S is obtained. In the concrete implementation, t is the threshold of biological unlocking, and the closer t is to n, the closer the biological data required for authentication is to all the biological data entered during re-registration.

In the concrete implementation of step S14, the public key and encrypted biological data are sent to a server.

In an embodiment, in order to ensure that the verification process of our encrypted biological feature data is completed on an untrusted server, the encrypted biological feature data and the public key are sent to the server via a channel. No matter whether the attacker intercepts the data or obtains the data on the server, because of the security of OKVS technology and public key cryptography, the attacker gives the biological information that is impossible to identify the user.

Figure 4:
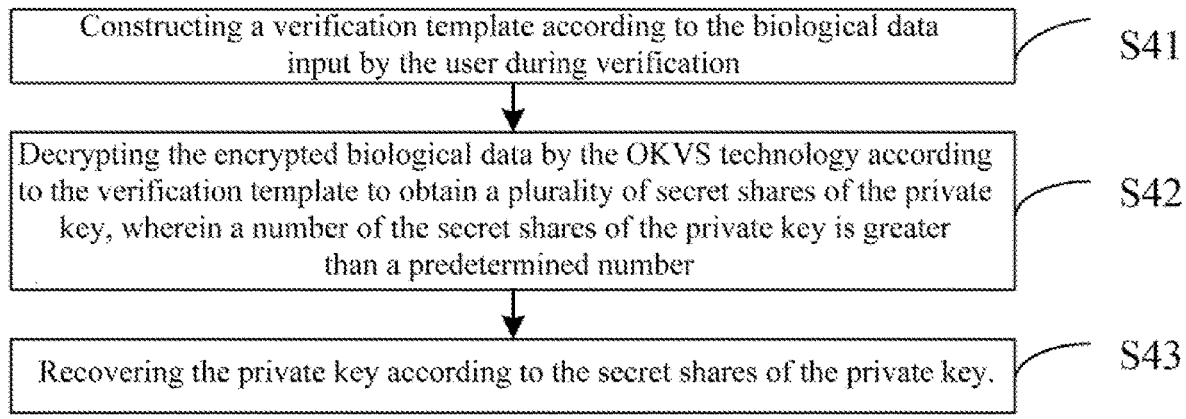
FIG. 4 is a flowchart of step S15 according to an exemplary embodiment.

In the concrete implementation of step S15, according to the biological feature data input by the user during authentication and the encrypted biological feature data, the private key is recovered by using OKVS technology;

In an embodiment, as shown in FIG. 4, this step includes the following sub-steps:

S41, constructing a verification template according to the biological data input by the user during verification;

In an embodiment, the process of constructing the verification template is the same as the process of constructing the corresponding biological data template in step S11.

S42, decrypting the encrypted biological data by the OKVS technology according to the verification template to obtain a plurality of secret shares of the private key. In an embodiment a number of the secret shares of the private key is greater than a predetermined number.

In an embodiment, the encrypted biological feature data S on the server and the authentication template of the user (as a key k) are put into the Decode algorithm. As for which Decode algorithm is used depends on which Encode algorithm is used to generate the encrypted biological feature data S in step S32. Then the user can obtain t' secret shares of the private key, and the predetermined number t is the threshold of biological unlocking. If the number of secret shares of the private key is less than the predetermined number, that is t'<t, the user can choose to stop the decryption process or re-enter the decrypted data. For example, the user can re-enter a larger fingerprint area into the sensor to reach the threshold for unlocking.

S43: recovering the private key according to the secret shares of the private key.

In an embodiment, if the obtained number of secret shares of the private keys t'≥t, any t shares of the t' secret shares of the private key are recovered by using the Rec algorithm secretly shared to obtain the recovered private key sk'. The secret shares of the private key obtained by the user may have the wrong value. Suppose the user gets t' secret shares of the private key, in which $t'_r$ shares are correct value and $t'_w$ shares are wrong, then if $t'_r+1 \geq t$, the user can find the correct value through violent search and recover the private key sk'; if $t'_r-t'_w \geq t$, the user can find out the correct secret share value and recover the private key in a time of O(t') by using the Berlekamp-Welch algorithm.

In the concrete implementation of step S16, a signature is constructed according to the recovered private key and the corresponding public key.

In an embodiment, when the user has successfully obtained sk' for client authentication, he needs to log in. The client can use the non-interactive zero-knowledge proof signature technology to construct a signature c. If there is a need for security, the post-quantum security NTRU signature algorithm can be used. In this embodiment, the common Schnorr signature technology is used to construct the signature, and the client and the server jointly agree on a piece of text Msg, which is public. Then, the client takes the public key pk corresponding to the user from the server, and randomly takes a number w in the domain to calculate $A=g^w$. e=Hash(pk, A, Msg) is constructed to construct z=w+e·sk'. The constructed signature is c=(A, z).

In the specific implementation of step S17, the signature is sent to the server, so that the server authenticates the user according to the public key and the signature.

In an embodiment, the client generates the signature c and sends it to the server. The server uses the user's public key pk, and then recalculates e=Hash(pk, A, Msg) and verifies whether $pk_e \cdot A = g^z$ is true. If it is true, the verification is successful, and the server provides services to the user. If it fails, the server rejects the user's request.

Corresponding to the aforementioned embodiments of a method for privacy protection biometric authentication, this application also provides an embodiment of a device for privacy protection biometric authentication.

Figure 5:
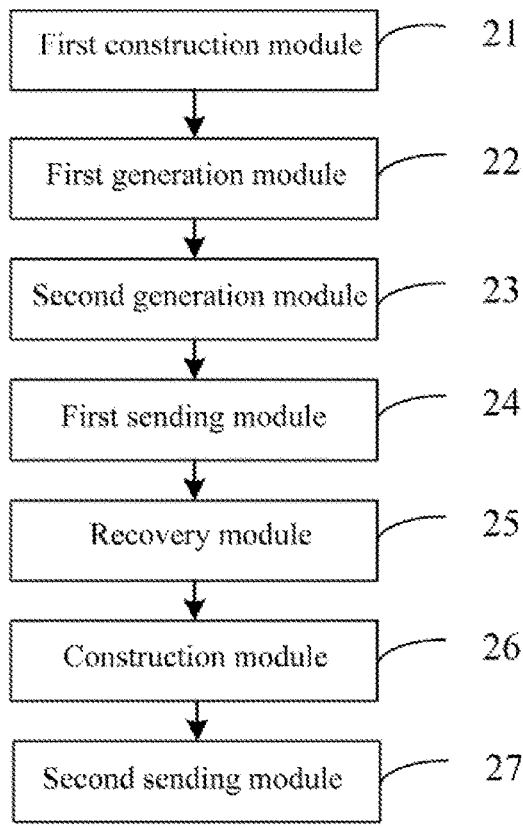
FIG. 5 is a block diagram of a device for privacy protection biometric authentication (applied to a client) according to an exemplary embodiment.

FIG. 5 is a block diagram of a device for privacy protection biometric authentication according to an exemplary embodiment. Referring to FIG. 5, the device is applied to the client and may include:

- a first construction module 21 used to construct a corresponding a biological data template according to a biological information data set input by a user when registering;
- a first generation module 22 used to generate a pair of public key and private key by asymmetric cryptography technology;
- a second generation module 23 used to generate encrypted biological data by a secret sharing solution and OKVS technology according to the biological data template and the private key;
- a first sending module 24 used to send the public key and the encrypted biological data to a server;
- a recovery module 25 used to recover the private key by OKVS technology according to the biological data input by the user during authentication and the encrypted biological data;
- a construction module 26 used to construct a signature according to the recovered private key and the corresponding public key; and
- a second sending module 27 used to send the signature to the server, so that the server verifies the user according to the public key and the signature.

Figure 6:
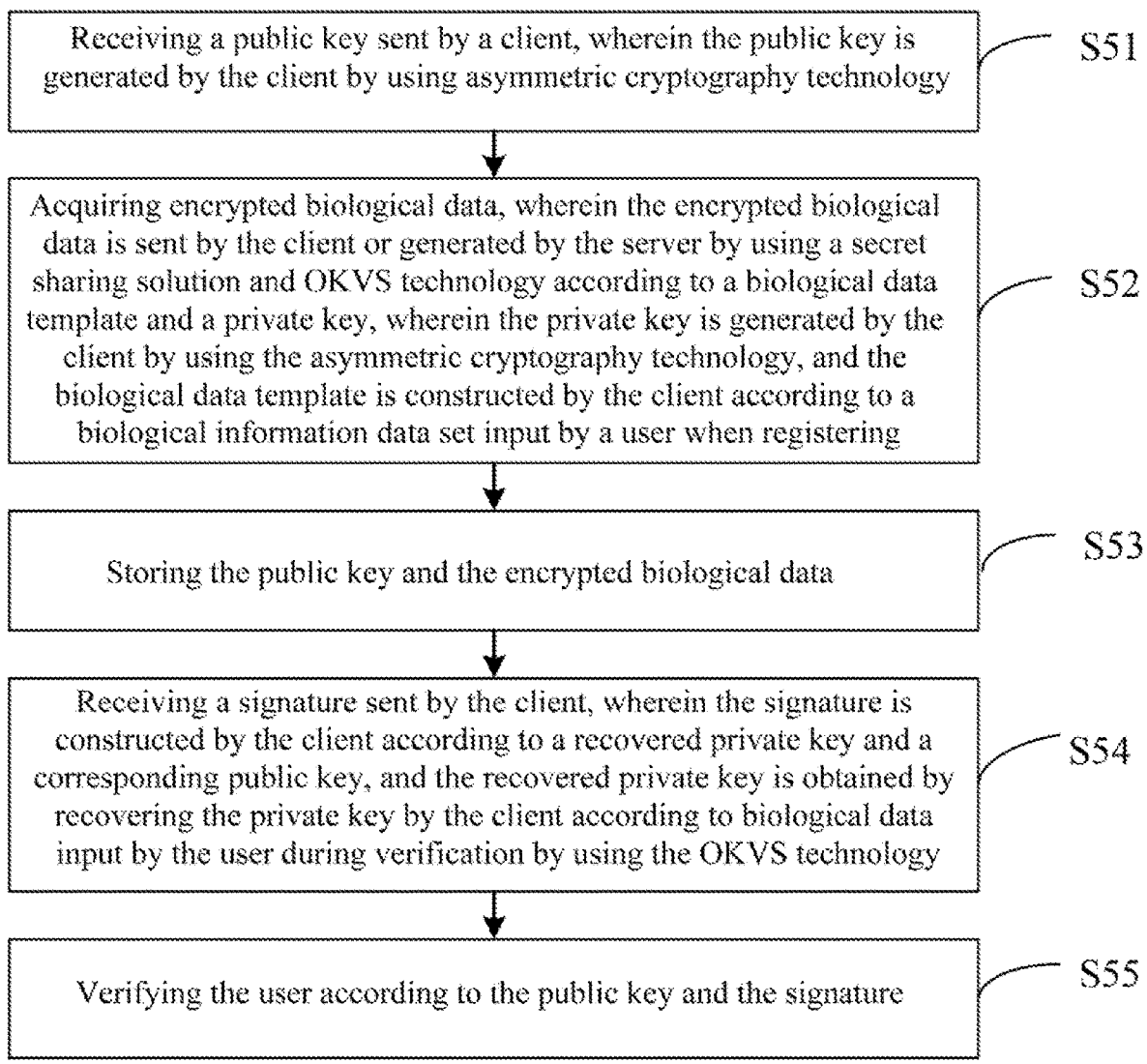
FIG. 6 is a flowchart of a method for privacy protection biometric authentication (applied to a server) according to an exemplary embodiment.

FIG. 6 is a flowchart of a method for privacy protection biometric authentication according to an exemplary embodiment. As shown in FIG. 6, the method is applied to a server and may include the following steps:

S51, receiving a public key sent by a client. In an embodiment the public key is generated by the client by using asymmetric cryptography technology.

In an embodiment, the client generates a pair of public and private keys according to the input public parameter g. pk is the public key and sk is the private key, satisfying $pk = g^{sk}$. The public key and private key are generated so as to conform to the algorithm used in the verification process.

S52, acquiring encrypted biological data. In an embodiment the encrypted biological data is sent by the client or generated by the server by using a secret sharing solution and OKVS technology according to a biological data template and a private key. In an embodiment the private key is generated by the client by using the asymmetric cryptography technology, and the biological data template is constructed by the client according to a biological information data set input by a user when registering.

In an embodiment, the number of the secret share of the private key is taken as the value and the biological feature data feature template as the key; OKVS technology is used to execute its Encode algorithm, and then the encrypted biological data S is obtained. The advantage of this is that S will not reveal the user's biological data.

S53, storing the public key and the encrypted biological data.

In an embodiment, the public key and encrypted biological feature data are placed on the server, which will not reveal the privacy of the user's biological feature data, but also facilitate the user's verification.

S54, receiving a signature sent by the client. In an embodiment the signature is constructed by the client according to a recovered private key and a corresponding public key, and the recovered private key is obtained by recovering the private key by the client according to biological data input by the user during verification by using the OKVS technology.

In an embodiment, the biological feature data feature template is used as the key, the OKVS technology which is the same as in encryption is used, and the Decode algorithm is used to obtain the number of secret shares of the private key sk. When the number of shares is greater than or equal to t, the private key is recovered by the Rec algorithm of secret sharing. If the number of the obtained secret shares of the private key sk is less than t, the client fails to decrypt, and the user can re-enter more biological information (such as fingerprints) or terminate the decryption process.

S55, verifying the user according to the public key and the signature.

In an embodiment, the client generates the signature c=(A, z) and sends it to the server. The server takes down the user's public key h from the blockchain, then recalculates e=Hash(h, A, Msg), and verifies whether $h^e \cdot A = g^z$ is valid. If so, the verification is successful, and the server provides services to the user. If it fails, it rejects the user's request.

Corresponding to the aforementioned embodiments of method for privacy protection biometric authentication, this application also provides an embodiment of a device for privacy protection biometric authentication.

Figure 7:
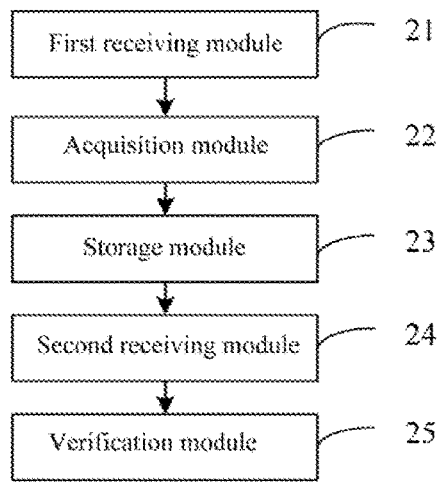
FIG. 7 is a block diagram of a device for privacy protection biometric authentication (applied to a server) according to an exemplary embodiment.

FIG. 7 is a block diagram of a device for privacy protection biometric authentication according to an exemplary embodiment. Referring to FIG. 7, the device is applied to a server and may include:

- a first receiving module 31 used to receive a public key sent by a client. In an embodiment the public key is generated by the client using asymmetric cryptography technology;
- an acquisition module 32 used to acquire encrypted biological data. In an embodiment the encrypted biological data is sent by the client or generated by the server by using a secret sharing solution and OKVS technology according to a biological data template and a private key. In an embodiment the private key is generated by the client by using the asymmetric cryptography technology, and the biological data template is constructed by the client according to a biological information data set input by a user when registering;
- a storage module 33 used to store the public key and the encrypted biological data;
- a second receiving module 34 used to receive a signature sent by the client. In an embodiment the signature is constructed by the client according to a recovered private key and a corresponding public key, and the recovered private key is obtained by recovering the private key by the client according to biological data input by the user during verification by using the OKVS technology; and
- a verification module 35 used to verify the user according to the public key and the signature.

Figure 8:
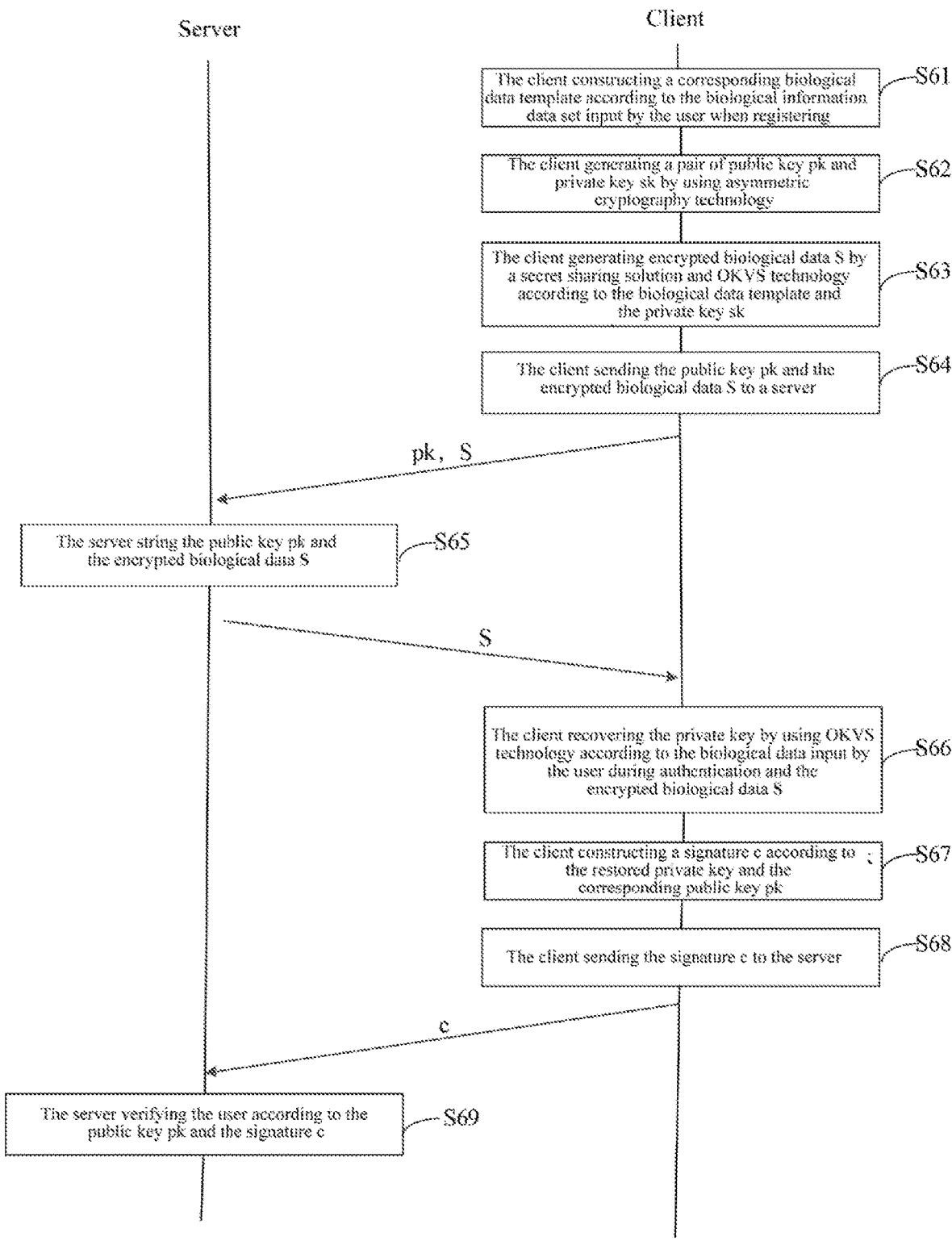
FIG. 8 is an interaction diagram of a method for privacy protection biometric authentication according to an exemplary embodiment.

As shown in FIG. 8, the process of a method for privacy protection biometric authentication provided by this application includes:

S61: the client constructing a corresponding biological data template according to the biological information data set input by the user when registering;

S62: the client generating a pair of public key pk and private key sk by using asymmetric cryptography technology;

S63: the client generating encrypted biological data S by a secret sharing solution and OKVS technology according to the biological data template and the private key sk;

S64: the client sending the public key pk and the encrypted biological data S to a server;

S65: the server string the public key pk and the encrypted biological data S;

S66: the client recovering the private key by using OKVS technology according to the biological data input by the user during authentication and the encrypted biological data S;

S67: the client constructing a signature c according to the restored private key and the corresponding public key pk;

S68: the client sending the signature c to the server;

S69: the server verifying the user according to the public key pk and the signature c.

Wherein, the specific implementation of steps S61-S69 has been described in detail above, and will not be repeated here.

With regard to the device in the above embodiment, the specific way in which each module performs operations has been described in detail in the embodiment of the method, and will not be explained in detail here.

As for the device embodiment, it basically corresponds to the method embodiment, so please refer to the part of the description of the method embodiment. The above-described device embodiments are only schematic, in which the units described as separate components may or may not be physically separated, and the components displayed as units may or may not be physical units, that is, they may be located in one place or distributed over multiple network units. Some or all of the modules can be selected according to the actual needs to achieve the purpose of the present disclosure solution. People of ordinary skill in this field can understand and implement it without creative labor.

Accordingly, the present disclosure also provides an electronic device, which includes one or more processors; A memory for storing one or more programs; when the one or more programs are executed by the one or more processors, the one or more processors implement the method for privacy protection biometric authentication as described above.

Accordingly, the present disclosure also provides a computer readable storage medium on which computer instructions are stored, which is characterized in that the instructions, when executed by a processor, implement the method for privacy protection biometric authentication as described above.

It would be easy for those skilled in the art to conceive of other embodiments of this application after considering the specification and practicing the contents disclosed herein. This application is intended to cover any variations, uses or adaptations of this application, which follow the general principles of this application and include common knowledge or common technical means in the technical field not disclosed in this application. The description and examples are to be regarded as examples only, and the true scope and spirit of this application are indicated by the following claims.

It should be understood that this application is not limited to the precise structure described above and shown in the drawings, and various modifications and changes can be made without departing from its scope. The scope of this application is limited only by the appended claims.

What is claimed is:

1. A method for privacy protection biometric authentication, which is applied to a client and comprising:

constructing a biological data template according to a biological information data input by a user when registering;

generating a pair of public key and private key by asymmetric cryptography technology; generating encrypted biological data by a secret sharing solution and OK VS (Oblivious Key-Value Store) technology according to the biological data template and the private key;

sending the public key and the encrypted biological data to a server;

recovering the private key by OKVS technology according to the biological information data input by the user during authentication and the encrypted biological data;

constructing a signature according to the recovered private key and the corresponding public key; and sending the signature to the server, so that the server verifies the user according to the public key and the signature;

wherein said generating encrypted biological data by the secret sharing solution and the OKVS technology according to the biological data template and the private key comprises:

sharing the private key as a corresponding number of secret shares of the private key according to a number of feature points in the biological data template; and generating the encrypted biological data by the OKVS technology according to the biological data template and the secret shares of the corresponding private key, comprising: selecting an OKVS technology randomly, adopting biological data as a key, taking the secret shares of the private key as values for encryption, and obtaining encrypted biological data; and wherein OKVS (Oblivious Key-Value Store) is a cryptographic protocol, and KVS (Key-Value Store) includes two algorithms: Encode algorithm and Decode algorithm, wherein an input of the Encode algorithm is a set of key-value pairs $\{(K_i, V_i)\}$, and if execution of the Encode algorithm 1s successful, an output of the Encode algorithm is a data structure S that stores key-value information; and wherein an input of the Decode algorithm is the data structure S that stores key information and a key $k_i$, and an output of the Decode algorithm is a value $v_i$ corresponding to the key $k_i$, $$S/\perp \leftarrow \mathrm{Encode}(\{(k_1, v_1,), (k_2, v_2) \ldots (k_n, v_n)\})$$

$$v_i \leftarrow \mathrm{Decode}(S, k_i)$$

where $\perp$ represents a termination symbol output when execution of the Encode algorithm is failed.

2. The method according to claim 1, wherein said constructing a biological data template according to a biological information data input by a user when registering comprises:

preprocessing the biological information data;

extracting features of the preprocessed biological information feature set to obtain biological feature data according to a type of biological information in the biological information data;

quantifying biological feature information according to a category corresponding to the biological feature data; and constructing the corresponding biological feature template according to the quantified biological feature data.

3. The method according to claim 1, wherein said recovering the private key by OKVS technology according to the biological data input by the user during authentication and the encrypted biological data comprises:

constructing a verification template according to the biological information data input by the user during verification;

decrypting the encrypted biological data by the OKVS technology according to the verification template to obtain a plurality of secret shares of the private key, wherein a number of the secret shares of the private key is greater than a predetermined number; and recovering the private key according to the secret shares of the private key.

4. A method for privacy protection biometric authentication, which is applied to a server, comprising:

receiving a public key sent by a client, wherein the public key is generated by the client using asymmetric cryptography technology;

acquiring encrypted biological data, wherein the encrypted biological data is sent by the client or generated by the server by using a secret sharing solution and (Oblivious Key-Value Store) OKVS technology according to a biological data template and a private key, wherein the private key is generated by the client by using the asymmetric cryptography technology, and the biological data template is constructed by the client according to a biological information data input by a user when registering;

storing the public key and the encrypted biological data;

receiving a signature sent by the client, wherein the signature is constructed by the client according to a recovered private key and a corresponding public key, and the recovered private key is obtained by recovering the private key by the client according to biological data input by the user during verification by using the OKVS technology; and verifying the user according to the public key and the signature;

wherein said generating encrypted biological data by the secret sharing solution and the OKVS technology according to the biological data template and the private key comprises:

sharing the private key as a corresponding number of secret shares of the private key according to a number of feature points in the biological data template; and generating the encrypted biological data by the OKVS technology according to the biological data template and the secret shares of the corresponding private key, comprising: selecting the OKVS technology randomly, adopting biological data as a key, taking the secret shares of the private key as values for encryption, and obtaining encrypted biological data; and wherein OKVS (Oblivious Key-Value Store) is a cryptographic protocol, and KVS (Key-Value Store) includes two algorithms: Encode algorithm and Decode algorithm, wherein an input of the Encode algorithm is a set of key-value pairs $\{(K_i, V_i)\}$, and if execution of the Encode algorithm 1s successful, an output of the Encode algorithm is a data structure S that stores key-value information; and wherein an input of the Decode algorithm is the data structure S that stores key information and a key $k_i$, and an output of the Decode algorithm is a value $v_i$ corresponding to the key $k_i$, $$S/\perp \leftarrow \text{Encode}(\{(k_1, v_1), (k_2, v_2) \ldots (k_n, v_n)\})$$

$$v_i \leftarrow \text{Decode}(S, k_i)$$

where $\perp$ represents a termination symbol output when execution of the Encode algorithm is failed.

5. An electronic device comprising:

one or more processors;

a memory for storing one or more programs;

wherein when the one or more programs are executed by the one or more processors, the one or more processors implement the method according to claim 1.

6. A non-transient computer readable storage medium on which computer instructions are stored, wherein the instructions, when executed by a processor, implement the method according to claim 1.

* * * * *